United States Patent [19]

Shallenberger et al.

[11] Patent Number: 4,667,547

[45] Date of Patent: May 26, 1987

[54] APPARATUS AND METHOD FOR REMOVING A TOP NOZZLE IN RECONSTITUTING A FUEL ASSEMBLY

[75] Inventors: John M. Shallenberger, Fox Chapel; Stephen J. Ferlan, Wilkins Township, Allegheny County, both of Pa.

[73] Assignee: Westinghouse Electric Corp., Pittsburgh, Pa.

[21] Appl. No.: 654,708

[22] Filed: Sep. 26, 1984

[51] Int. Cl.⁴ .............................................. B23B 5/14
[52] U.S. Cl. .................................... 82/4 R; 29/400 N; 29/723; 29/726; 30/103; 269/48; 269/48.1; 269/60; 269/288; 376/261; 376/271; 376/446
[58] Field of Search .............. 408/72 R, 72 B, 115 R; 269/1, 48, 47, 48.1, 48.2, 48.3, 49, 50, 52, 60, 287, 288, 900, 909; 29/426.4, 400 N, 723, 726, 426.5; 82/4 R, 4 C; 376/271, 261, 446; 30/103-108; 228/183

[56] References Cited

U.S. PATENT DOCUMENTS

| | | | |
|---|---|---|---|
| 2,276,727 | 3/1942 | Johnson | 30/107 |
| 3,379,619 | 4/1968 | Andrews et al. | |
| 3,587,362 | 6/1971 | Cho | 408/115 |
| 3,770,583 | 11/1973 | Klumb et al. | |
| 3,828,868 | 8/1974 | Jabsen | |
| 3,846,892 | 11/1974 | Young | 29/726 |
| 3,887,980 | 6/1975 | Yates et al. | 29/400 N |
| 4,314,491 | 2/1982 | Hartmann et al. | 82/4 R |
| 4,358,421 | 11/1982 | Jabsen | 376/271 |
| 4,522,330 | 6/1985 | Kerrey et al. | 228/182 |
| 4,539,738 | 9/1985 | Antol et al. | 29/400 N |

FOREIGN PATENT DOCUMENTS

| | | |
|---|---|---|
| 0066695 | 12/1982 | European Pat. Off. . |
| 81180 | 6/1983 | European Pat. Off. .............. 82/4 R |
| 0082075 | 6/1983 | European Pat. Off. . |
| 0109902 | 5/1984 | European Pat. Off. . |
| 2533741 | 3/1984 | France . |

Primary Examiner—Lowell A. Larson
Assistant Examiner—Jerry Kearns

[57] ABSTRACT

A cutter guide fixture for use in removing a top nozzle from the guide thimbles of a fuel assembly includes upper and lower plates coupled to one another for movement of the upper plate relative to the lower plate between upper and lower positions. The plates include aligned pairs of holes within which are mounted a plurality of cutters such that the cutting elements of the cutters are disposed in a common cutting plane. A pair of expansion locking pins are provided at a pair of diagonal corners of the lower plate for releasably attaching the fixture to the top nozzle and positioning the cutters in general alignment with a plurality of passageways defined in the adapter plate of the top nozzle and with a plurality of hollow upper end portions of the guide thimbles inserted and attached in the passageways. A threaded shaft interconnects the upper and lower plate such that rotation of the shaft in either of two directions will move the upper plate between its upper and lower positions and move the cutters between raised positions withdrawn from the passageways and inserted positions where their cutting elements are disposed in the passageways and hollow upper end portions of the guide thimbles.

8 Claims, 7 Drawing Figures

2

APPARATUS AND METHOD FOR REMOVING A TOP NOZZLE IN RECONSTITUTING A FUEL ASSEMBLY

CROSS REFERENCE TO RELATED APPLICATIONS

Reference is hereby made to the following co-pending U.S. patent applications dealing with related subject matter and assigned to the assignee of the present invention:

1. "Reconstituting a Nuclear Reactor Fuel Assembly" by John M. Shallenberger et al, U.S. Ser. No. 422,224, filed Sept. 23, 1982.

2. "Precision Internal Tube Cutter" by N. Nokovich, U.S. Ser. No. 544,166, filed Oct. 21, 1983.

BACKGROUND OF THE INVENTION

1. Field of the Invention

The present invention relates generally to fuel assemblies for nuclear reactors and, more particularly, is concerned with an apparatus and method for removing a top nozzle as a first step in reconstituting a fuel assembly wherein a plurality of cutters are lowered and raised at the same time to ensure that a plurality of cuts are made in a single common plane. 2. Description of the Prior Art Conventional designs of fuel assemblies include a plurality of fuel rods and control rod guide thimbles held in an organized array by grids spaced along the fuel assembly length and attached to the control rod guide thimbles. Top and bottom nozzles on opposite ends of the fuel assembly are secured to the control rod guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle and the uppermost grid.

During operation of such assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of an intergral assembly of guide thimbles welded to the top and bottom nozzles, it is difficult to detect and remove the failed rods.

Until recently, to gain access to these rods it was necessary to remove the affected assembly from the nuclear reactor core and then break the welds which secure the nozzles to the control rod guide thimbles. In so doing, the destructive action often renders the fuel assembly unfit for further use in a reactor because of the damage done to both the guide thimbles and the nozzles which prohibits rewelding.

Recently, as described in the first patent application cross-referenced above, a method for reconstituting a fuel assembly has been devised which does not involve breaking the welds which attach the guide thimbles to the adapter plate of the top nozzle. Instead, the guide thimbles are severed from the adapter plate by circumferentially cutting each thimble just below the attachment area. Then, the original top nozzle is removed from the cut guide thimbles. The upper ends of the fuel rods are now exposed from the top of the fuel assembly. Thus, access to the fuel rods is gained for any of a variety of purposes: inspecting them for failure, removing and replacing failed rods, transferring partially spent fuel rods from one assembly to another, and/or rearrangement of fuel rods to attain better uranium utilization in the reactor core. Once, inspection, removal, replacement and/or rearrangement of the fuel rods is completed, a new top nozzle having an adapter plate containing modified guide thimble passageways is placed on the cut guide thimbles and the upper ends of the thimbles are circumferentially bulge fitted into annular grooves formed in the passageways.

While the fuel assembly reconstitution method briefly described above has demonstrated considerable promise as a measure by which domestic and foreign utilities can minimize both operating and maintenance expenses, a need exists for improvements in the manner in which the method is carried out so as to enhance its commercial acceptance.

SUMMARY OF THE INVENTION

The present invention provides an apparatus and method for removing the top nozzle designed to satisfy the aforementioned needs. Underlying the present invention is the recognition that not only precision cutting of the guide thimbles is essential; of equal or maybe even greater significance is that all of the cuts in the guide thimbles be made in a single, common plane. It is important that all of the guide thimbles be cut off at the same axial height. If they are not, the new top nozzle will not seat properly on the cut thimbles. If the guide thimbles are cut by multiple successive placements of a single or several cutters without reference to any common plane, it is highly unlikely that the cuts will be performed at the same axial heights. The present invention provides the apparatus and method for ensuring that the cuts are made in a common plane.

Accordingly, the present invention sets forth for use with a fuel assembly including a top nozzle having a central adapter plate with a plurality of passageways defined through the adapter plate and a plurality of control rod guide thimbles with hollow upper end portions inserted in the passageways and attached to the top nozzle adapter plate at the upper ends of the passageways, an apparatus and method for removing the top nozzle from the guide thimbles, comprising the operative steps of: (a) positioning at least one cutter in general alignment with one of the passageways in the top nozzle adapter plate and the respective one hollow upper end portion of the guide thimble inserted therein; (b) moving the cutter in a first direction toward the one of the passageways until the cutter is inserted within the passageway and the respective hollow upper end portion of the guide thimble therein and its cutting element is positioned in a predetermined plane extending generally perpendicular to the first direction and intersecting the guide thimble upper end portions at positions located past their regions of attachment to the adapter plate; (c) actuating the cutting element of the cutter to sever a top marginal edge of the guide thimble, which includes the region of attachment, along the predetermined plane from the remainder of the upper end portion thereof; (d) removing the cutter from the passageway of the top nozzle adapter plate; and (e) after the top marginal edge of each guide thimble has been severed along the predetermined plane, removing the top nozzle from the severed upper end portions of the guide thimbles.

Preferably, the apparatus comprises a guide fixture having upper and lower plates which mount a plurality of the cutters in spaced apart side-by-side relationship with their cutting elements disposed in a common plane. The upper plate of the fixture and the cutters therewith are mounted for movement together toward and away from the lower fixture plate. Once the lower plate of the fixture has been placed on and secured to corner pads of the top nozzle, the upper plate is moved from an upper position remote from the lower plate to a lower position adjacent thereto which displaces the cutters from retracted positions above the top nozzle adapter plate to inserted positions. In their inserted positions, the cutters extend within the passageways of the adapter plate and the hollow upper ends of the guide thimbles with the common plane of their cutting elements aligned coplanar with the predetermined desired cutting plane. After each of the cutters have been actuated to sever the upper marginal ends of the guide thimbles, the upper plate is moved away from the lower plate from its lower to upper positions which, in turn, withdraws the cutters from their inserted positions back to their retracted positions. Then, the fixture with its lower plate still secured to the top nozzle is moved away from the guide thimbles which has the effect of lifting and removing from the cut guide thimbles the top nozzle and therewith the severed upper marginal edges of the guide thimbles remaining attached to the adapter plate of the top nozzle.

In their retracted positions, lower portions of the cutters mounting the cutting elements extend below the lower plate of the fixture. A continuous skirt depends from the perimeter of the lower plate surrounding the lower portions of the cutters so as to protect their cutting elements from damaging contact during positioning of the fixture to align it with the top nozzle of the fuel assembly. A central threaded shaft interconnects the upper and lower plates of the fixture and is rotated to move the upper plate relative to the lower plate. The central shaft is also used in moving the fixture relative to the fuel assembly.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 6 is a fragmentary perspective view of the end of one actuating tool, with portions broken away, for moving the fixture.

FIG. 7 is a fragmentary perspective view of the end of the other actuating tool, with portions broken away, for moving the upper plate of the fixture relative to the lower fixture plate.

DETAILED DESCRIPTION OF THE INVENTION

Figure 1:
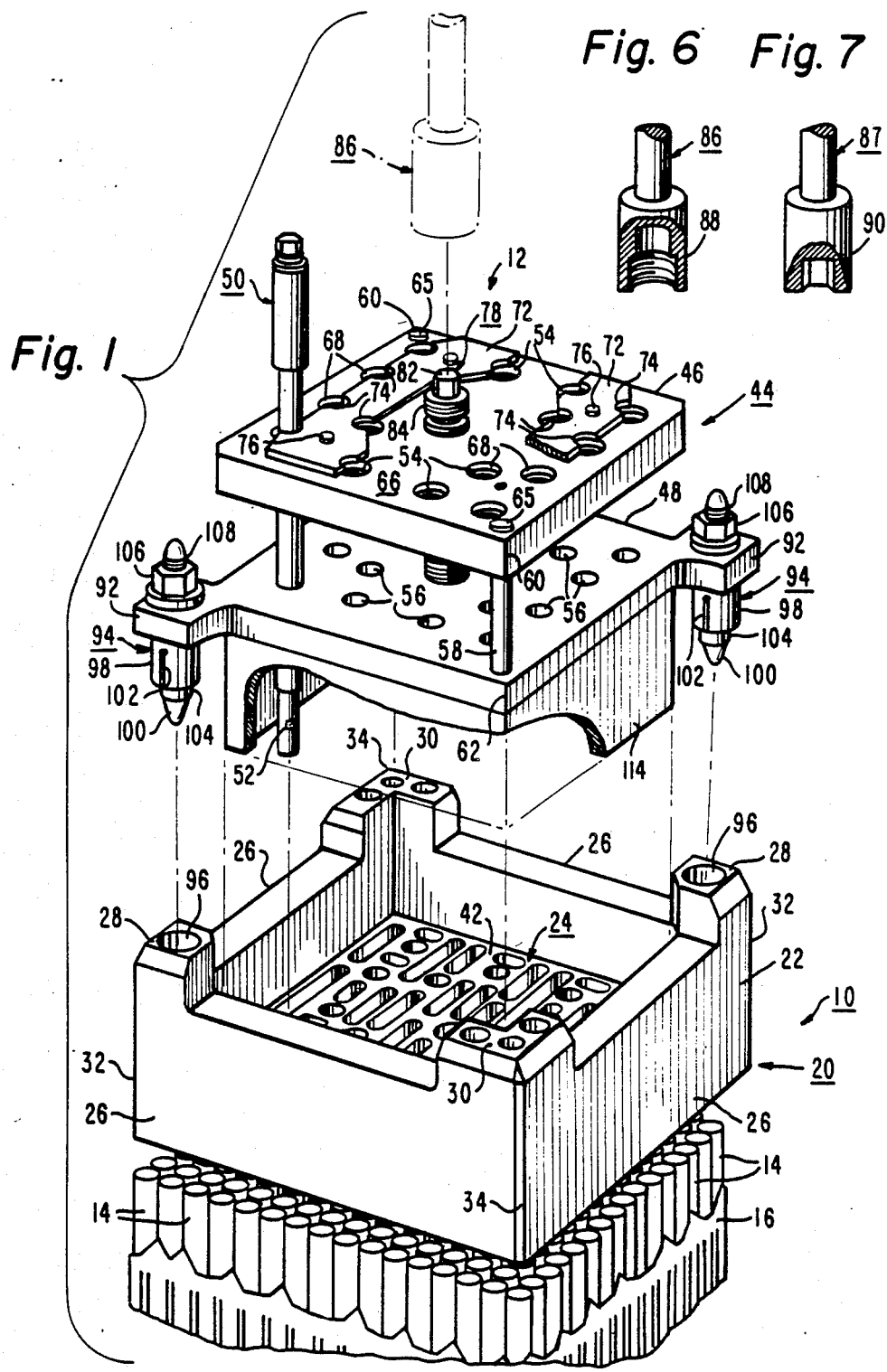
FIG. 1 is a perspective view of the apparatus of the present invention aligned for positioning on the top nozzle of a fuel assembly with a skirt on the lower plate of a guide fixture of the apparatus being broken away and only one cutter being shown mounted on the upper and lower plates of the fixture.

In the following description, like reference characters designate like or corresponding parts throughout the several views of the drawings. Also, in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown a perspective view of the upper end of a fuel assembly, being generally designated by the numeral 10, and a perspective view of a top nozzle removing apparatus, generally indicated by the numeral 12, which comprises the preferred embodiment of the present invention.

The fuel assembly 10, being of conventional construction, includes an array of fuel rods 14 held in spaced relationship to one another by a number of grids 16 (only the uppermost one of which is shown in FIG. 1) spaced along the fuel assembly length. Each fuel rod 14 includes nuclear fuel pellets (not shown) and is sealed at its opposite ends. The fuel pellets composed of fissible material are responsible for creating the reactive power of the nuclear reactor core in which the assembly 10 is placed. A liquid moderator/coolant such as water, or water containing boron, is pumped upwardly through the fuel assemblies of the core in order to extract heat generated therein for the production of useful work.

The fuel assembly 10 also includes a number of longitudinally extending guide tubes or thimbles 18 (FIGS. 2, 3 and 5) along which the grids 16 are spaced and to which they are attached. The opposite ends of the guide thimbles 18 extend a short distance past the opposite ends of the fuel rods 14 and are attached respectively to a bottom nozzle (now shown) and a top nozzle 20. Typically, the guide thimbles 18 include upper and lower sleeve portions which interconnect the uppermost and lowermost grids 16 respectively with the top nozzle 20 and the bottom nozzle.

To control the fission process, a number of control rods (now shown) are reciprocally movable in the guide thimbles 18 located at predetermined positions in the fuel assembly 10. Specifically, the top nozzle 20 includes a rod cluster control mechanism (now shown) interconnected to the control rods and operable to move the control rods vertically in the guide thimbles 18 to thereby control the fission process in the fuel assembly 10, all in a well-known manner.

Figure 2:
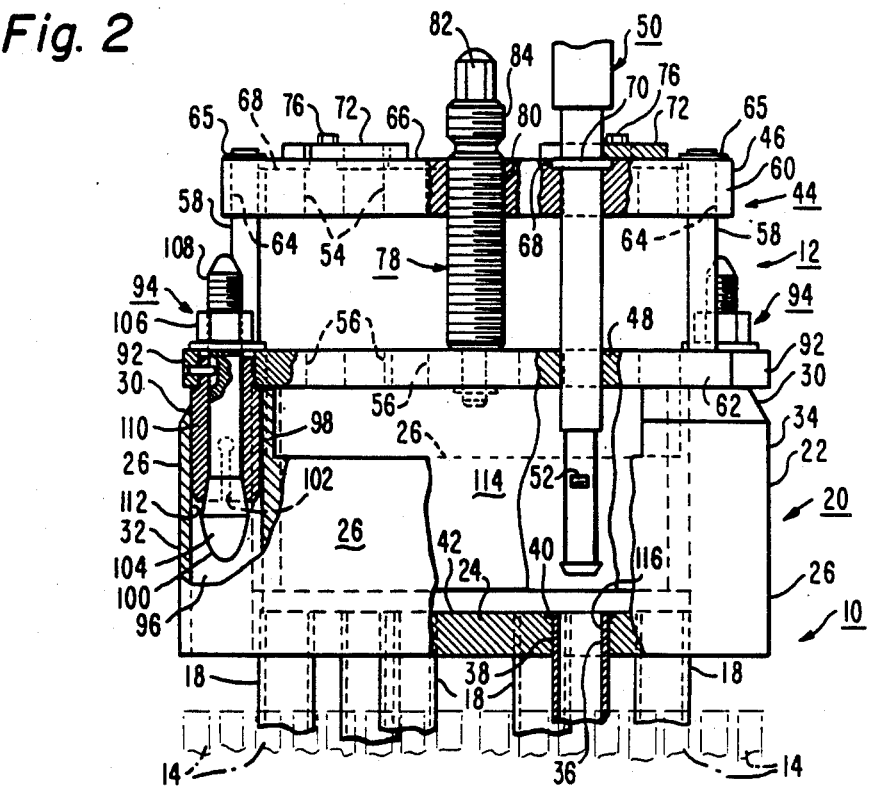
FIG. 2 is a side elevational view of the apparatus of FIG. 1 with parts of the top nozzle, the skirt and upper and lower plates of the fixture being broken away to reveal a corner expansion locking pin, a central threaded shaft and the cutter (being in a different position than shown in FIG. 1), the upper plate being depicted in its upper position relative to the lower plate and, as a result, the cutter being disposed in its retracted position relative to an adapter plate of the top nozzle.

As illustrated in FIGS. 1 and 2, the top nozzle 20 is generally square-shaped and comprises a housing 22 having a lower adapter plate 24 surrounded by four interconnected, upstanding side walls 26 with raised sets of pads 28,30 located respectively at pairs of diagonal corners 32,34 formed by the side walls 26. The control rod guide thimbles 18 have their uppermost end portions 36 coaxially positioned within control rod passageways 38 formed through the adapter plate 24 of the top nozzle 20. The upper end portions 36 of the guide thimbles 18 are attached to the adapter plate 24 at the upper ends of the passageways 38 preferably by welds 40 (or any other suitable metallurigical attachment) at the adapter plate's upper surface 42.

Removing the Top Nozzle of the Fuel Assembly

When a decision is made to reconstitute the fuel assembly 10 (which will occur in only a small percentage of fuel assemblies during their useful life), the apparatus 12 of the present invention is used to remove the top nozzle 20 from the guide thimbles 18 of the fuel assembly 10.

Figure 3:
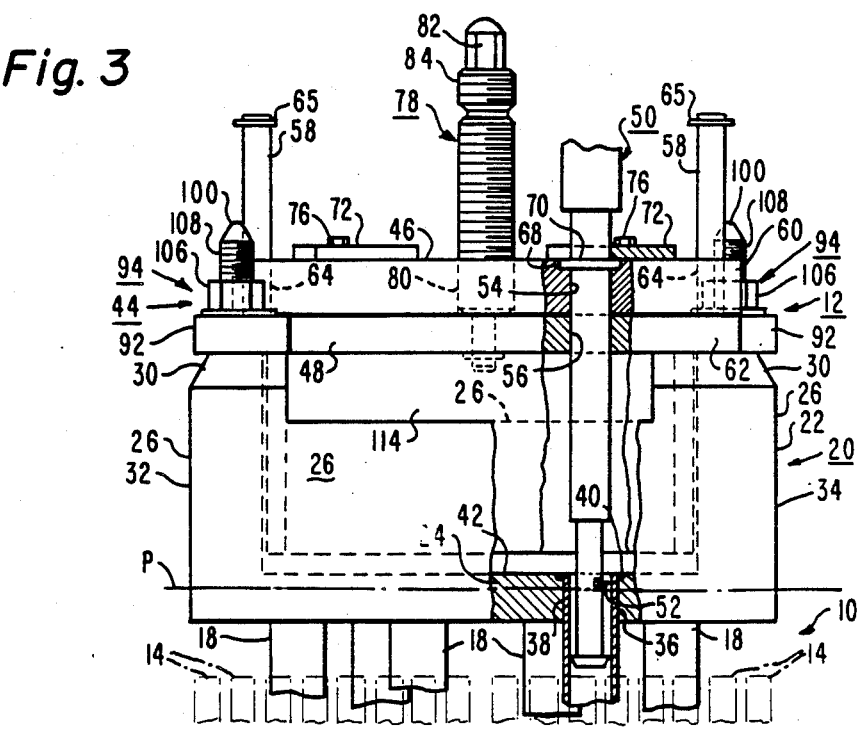
FIG. 3 is a view similar to that of FIG. 2, but showing the upper plate of the fixture at its lower position relative to the lower plate and, as a result, the cutter being disposed in its inserted position within a passageway in the adapter plate and the upper end portion of the guide thimble with its cutting element located along a predetermined cutting plane.
Figure 4:
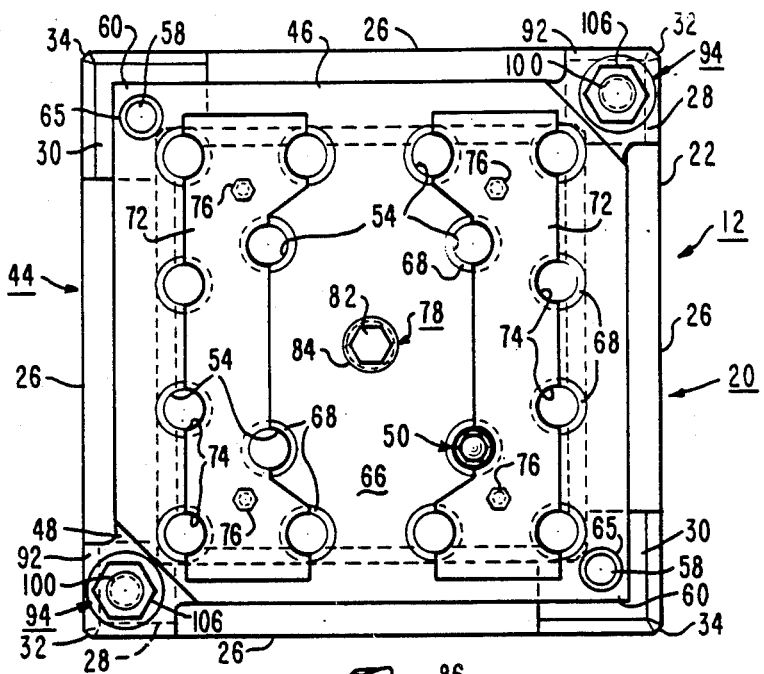
FIG. 4 is a top plan view of FIG. 3.

Referring now to FIGS. 1 through 5, the apparatus 12 includes a cutter guide fixture 44 having upper and lower plates 46,48 which preferably mount a full complement of cutters 50 (it being sufficient herein for a satisfactory explanation of the invention and for the sake of clarity that only one of the cutters be shown in the drawings) in spaced apart side-by-side relationship with their cutting elements 52 disposed in a common, horizontal plane. In view that there are sixteen guide thimbles 18 in the illustrated embodiment of the fuel assembly 10 that must be severed to remove the top nozzle 20, it is preferred that a full complement of sixteen cutters 50 be mounted in the guide fixture 44; however, it is possible, although less efficient, to use only one or less than a full complement of cutters with the fixture. The important result accomplished by the apparatus 12 is that it ensures that all of the cuts in the guide thimbles 18 are made in a single, common cutting plane P (FIG. 3). The cutter 50 can take the form of the precision cutter illustrated and described in the second patent application cross-referenced above, the disclosure of which is incorporated by reference herein.

The upper and lower plates 46,48 have respective pluralities of holes 54,56 defined through them, preferably sixteen in number in the illustrated embodiment, and a pair of alignment pins 58 disposed at a first respective pairs of diagonal corners 60,62. The alignment pins 58 are fixed to and extend upwardly from the corners 62 of the lower plate 48 and extend through openings 64 formed through the corners 60 of the upper plate 46. In such mounting arrangement, the upper plate 46 can slidably move vertically toward and away from the lower plate 48, while the plates are constrained from moving laterally with respect to one another so that their respective pluralities of holes 54,56 are maintained in aligned pairs with each other. The alignment pins 58 each has an upper head 65 of a diameter larger than the corner openings 64 in the upper plate 46. Thus, the heads 65 of the pins 58 define the limits of travel of the upper plate 46 away from the lower plate 48.

Each aligned pair of holes 54,56 in the pluralities thereof has one cutter 50 extending therethrough. The upper plate 46 has defined in its upper surface 66 a recessed shoulder 68 surrounding each of its holes 54 and an annular flange 70 attached to the cutter 50 about one-third of its length down from its upper end is received in the shoulder 68, as seen clearly in FIGS. 2 and 3. A pair of keeper plates 72 with half moon shaped cutouts 74 spaced about their peripheries are attached to the upper surface 66 of the upper plate 46 by screws 76 such that each of their cutouts 74 overlies approximately one-half of the periphery of one of the holes 54 and the annular flange 70 of the cutter 50 seated therein. Therefore, the cutter 50 is attached to the upper plate 46 and slidable through the hole 56 in the lower plate 48.

The cutter guide fixture 44 also includes a central threaded shaft 78 which interconnects the upper and lower plates 46,48 thereof. The shaft 78 is rotatably coupled to the lower plate 48 and threaded into an internally threaded opening 80 in the upper plate 46. Rotation of the threaded shaft 78 in one direction (such as counterclockwise) will cause the upper plate 46 to move from an upper position remote from the lower plate 48, as seen in FIG. 2, toward the lower plate 48 to a lower position adjacent to the lower plate 48, as seen in FIG. 3, while rotation in an opposite direction (such as clockwise) will cause the upper plate 46 to move away from the lower plate 48 from its lower to upper positions, or from its position in FIG. 3 to its position in FIG. 2.

The central threaded shaft 78 on its upper end has an upper inner hex head 82 and a lower outer threaded head 84. A pair of long-handled tools 86,87 (the end portion of one tool 86 being seen in phantom outline in FIG. 1) are used to engage selected ones of the heads 82,84. Two different female sockets 88,90 on the respective tools 86,87 are illustrated in FIGS. 6 and 7. The socket 88 is internally threaded to engage the threaded head 84 of the central shaft 78, while the socket 90 is hex shaped to engage the hex head 82 of the shaft. The tool 86 is used for installing and lifting the guide fixture 44 on and from the top nozzle 20. The tool 87 is used for rotating the central shaft 78 to lower and raise the upper plate 46 and cutter 50 relative to the lower plate 48.

For locking the guide fixture 44 on the top nozzle 20, the lower plate 48 of the fixture 44 has a pair of diagonal extensions 92 which mount a pair of corner expansion locking means 94 mateable with a pair of bores 96 defined in the pair of diagonal raised corner pads 28 of the top nozzle 20. Each of the locking means 94 includes a hollow split sleeve 98 attached to each of the extensions 92 and a wedge pin 100 inserted into the sleeve 98 from the lower end. The lower end portion of the sleeve 98 contains several axially extending slots 102 which are expandable circumferentially outward when an enlarged conical head 104 on the lower end of the wedge pin 100 is drawn in an upward direction by tightening nut 106 on the threaded upper end 108 of the pin 100. Expansion of the sleeve 98 creates a tight friction fit between its outer surface 110 and the internal surface 112 of the bore 96 which attaches the fixture 44 to the top nozzle 20.

Finally, the guide fixture 44 includes a continuous skirt 114 which depends from the perimeter of the lower plate 48. The skirt 114 surrounds the lower portions of the cutters 50 so as to protect their cutting elements 52 from damaging contact during positioning of the fixture 44 to align it with the top nozzle 20. The skirt has an outer perimeter sized to fit within the nozzle housing 22 when the corner extensions 92 on the lower plate 48 are brought into a rest position on the corner pads 28 of the top nozzle 20.

For removal of a standard top nozzle 20 from the fuel assembly 20 where the guide thimbles 18 are welded to the adapter plate 24 of the top nozzle 20, the fuel assembly is removed from the reactor core and inserted in an upright position into a work station. With preferably a full complement of cutters 50 mounted to the cutting guide fixture 44, the long-handled fixture tool 86 is threaded on the head 84 of the central shaft 78 and the fixture 44 is lowered toward the top nozzle 20, visually guiding the two wedge pins 100 of the lower plate 48 into the corner bores 96 in the raised corner pads 28 of the top nozzle 20. Once the fixture 44 is resting on the four corner pads 28,30 of the top nozzle 20, using another long-handled socket tool (not shown but similar to tool 87), the nuts 106 are tightened, such as to a torque of 25 ft-lbs. This causes the head 104 on pins 100 to rise into the split sleeves 98 and secure the guide fixture 44 to the nozzle 20.

Once the lower plate 48 of the fixture 44 has been placed on and secured to the corner pads 28 of the top nozzle 20, the upper plate 46 is moved from an upper position (FIG. 2) to a lower position (FIG. 3). This is accomplished by engaging the hex head 82 of the central shaft 78 with the hex socket 90 of the actuating tool 87 and then turning the tool counterclockwise. The upper plate 46 is lowered until it rests against the lower plate 48. As the plate 46 is moved downward or lowered, each cutter 50 is displaced from a retracted position (FIG. 2) above the top nozzle adapter plate 24 and above the lower edge of the skirt 114 to an inserted position (FIG. 3) where the cutter extends within the passageway 38 of the adapter plate 24 and within the hollow upper end portion 36 of the guide thimble 18. When a full complement of cutters 50 is used, their cutting elements 52 are aligned coplanar with a predetermined desired cutting plane P through the guide thimble portions 36. The cutting blade or element 52 on each cutter 50 and thus the cutting plane P is preferably 0.125 inch below the upper surface 42 of the adapter plate 24. To sever an upper marginal edge 116 of each guide thimble 18, a long-handled cutter actuating tool (not shown but similar to tool 87) is lowered over the upper end of a first designated cutter 50 and the cutter 50 is actuated to sever the guide thimble 18 as described in the second patent application cross-referenced above.

Figure 5:
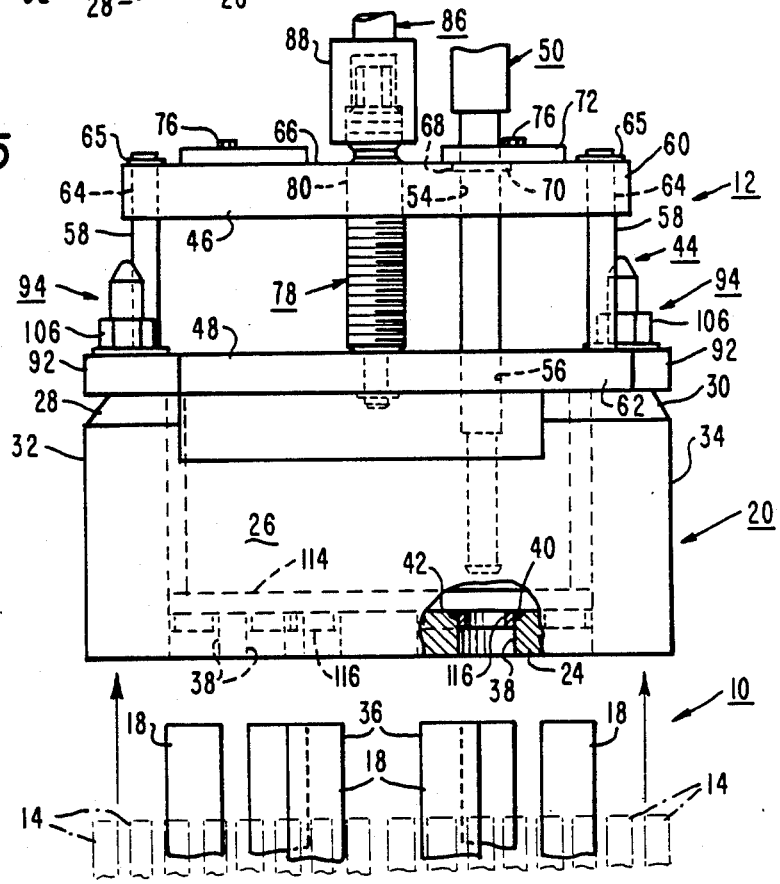
FIG. 5 is a view similar to that of FIG. 3, but showing the upper plate of the fixture back at its upper position and the cutter disposed back at its retracted position, as shown in FIG. 2; however, now the fixture and severed top nozzle to which the fixture is still secured are shown lifted from the cut guide thimbles of the fuel assembly.

After each cutter 50 has been actuated and the severing operation is completed, the upper plate 46 is then moved from its lower position (FIG. 3) back to its upper position (FIG. 2) by reversal of the steps previously described to lower the upper plate 46. Such movement also withdraws the cutters 50 from their inserted to retracted positions. Now, instead of detaching the guide fixture 44 from the top nozzle 20, the fixture tool 86 is again attached to the central shaft 78 and the fixture 44 and top nozzle 20 attached thereto but detached from the guide thimbles 18 are lifted together upwardly away from the fuel assembly 10, as depicted in FIG. 5. As seen in the figure, the severed upper marginal edges 116 of the guide thimbles 18 remain attached to the adapter plate 24 of the top nozzle 20.

With the top nozzle 20 now removed from the fuel assembly 10, the top of the asembly is exposed for inspection and removal of any or all of the fuel rods 14 in the assembly. If the fuel assembly is to be reconstituted for further use, a new top nozzle may now be mounted on the guide thimbles 18 as described in the first patent application cross-referenced above.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. For use with a fuel assembly including a top nozzle having a central adapter plate with a plurality of passageways defined through the adapter plate and a plurality of control rod guide thimbles with hollow upper end portions inserted in the passageways and attached to the top nozzle adapter plate at the upper ends of the passageways, an apparatus for removing the top nozzle from the guide thimbles, comprising:
    (a) a plurality of elongated cutters having respective cutting elements;
    (b) means for positioning said cutters in general alignment with said passageways in said top nozzle adapter plate and said respective hollow upper end portions of the guide thimbles inserted therein;
    (c) means for moving said cutters in a first direction toward said passageways until said cutters are inserted within said passageways and the respective upper end portions of the guide thimbles therein and their cutting elements are positioned in a predetermined cutting plane extending generally perpendicular to said first direction and intersecting said guide thimble upper end portions at positions located past their regions of attachment to said adapter plate;
    (d) said moving means also for moving said cutters in a second, opposite direction away from said passageways to remove said cutters from said passageways of said top nozzle adapter plate after said cutting elements have been actuated to sever top marginal edges of said guide thimbles, which include said regions of attachment, along said predetermined plane from the remainder of said upper end portions thereof; and
    (e) said positioning means including a guide fixture having upper and lower members, said lower member being mountable to said top nozzle and said upper member mounted to said lower member for movement toward and away therefrom between upper and lower positions, said cutters being mounted to said upper member and movable therewith relative to said lower member between raised and lowered positions, said guide fixture also for removing said top nozzle from the severed upper end portions of said guide thimbles and said cutters therewith when said lower member of said guide fixture is mounted to said top nozzle.

2. For use with a fuel assembly including a top nozzle having a central adapter plate with a plurality of passageways defined through the adapter plate and a plurality of control rod guide thimbles with hollow upper end portions inserted in the passageways and attached to the top nozzle adapter plate at the upper ends of the passageways, an apparatus for removing said top nozzle from said guide thimbles, comprising:

(a) a cutter guide fixture having upper and lower plates with pluralities of holes defined through said respective plates and a pair of alignment pins mounting said plates for movement relative to one another and aligning said holes in said pluralities thereof in pairs;

(b) a plurality of cutters mounted to said plates in said aligned pairs of holes thereof, said cutters each being attached to said upper plate and movable therewith relative to said lower plate and having a cutting element disposed in a common cutting plane with said cutting elements of said other cutters;

(c) a pair of expansion locking means mounted to said lower plate and mateable with said top nozzle for releasably securing said fixture to said top nozzle with said plurality of cutters aligned with said passageways of said adapter plate and said hollow upper end portions of said guide thimbles inserted therein; and (d) a central threaded shaft interconnecting said upper and lower plates, said shaft being rotatably coupled to said lower plate and threadably connected to said upper plate such that upon rotation in one direction said upper plate is moved from an upper position to a lower position which displaces said plurality of cutters from retracted positions to inserted positions within said passageways and said guide thimble upper end portions and upon rotation in an opposite direction said upper plate is moved from said lower position to said upper position which displaces said plurality of cutters from said inserted positions to said retracted positions, said cutting elements of said cutters being maintained in said common cutting plane in both of said retracted and inserted positions.

3. For use with a fuel assembly including a top nozzle having a central adapter plate with a plurality of passageways defined through the adapter plate and a plurality of control rods guide thimbles with hollow upper end portions inserted in the passageways, a method for removing the top nozzle from the guide thimbles, comprising the steps of:

(a) mounting a plurality of cutters on a common guide fixture;

(b) securing the guide fixture to the top nozzle so as to position the cutters in general alignment with the passageways in the top nozzle adapter plate and the respective hollow upper end portions of the guide thimbles inserted therein:

(c) moving the cutters simultaneously in a first direction toward the passageways until the cutters are inserted within the passageways and the respective hollow upper end portions of the guide thimbles therein and their respective cutting elements are positioned in a predetermined cutting plane extending generally perpendicular to the first direction and intersecting the guide thimble upper end portions at positions located past their regions of attachment to the adapter plate;

(d) actuating the cutting elements of the cutters to sever respective top marginal edges of the guide thimbles, which include the regions of attachment, along the predetermined plane from the remainder of the upper end portions thereof;

(e) removing the cutters from the passageways of the top nozzle adapter plate; and (f) removing the guide fixture while still secured to the top nozzle for removing the top nozzle from the severed upper end portions of the guide thimbles and the cutters and guide fixtures with the top nozzle.

4. For use with a fuel assembly including a top nozzle having a central adapter plate with a plurality of passageways defined through the adapter plate and a plurality of control rod guide thimbles with hollow upper end portions inserted in the passageways and attached to the top nozzle adapter plate at the upper ends of the passageways, an apparatus for removing the top nozzle from the guide thimbles, comprising:

(a) at least one elongated cutter having a cutting element;

(b) means for positioning said cutter in general alignment with one of said passageways in said top nozzle adapter plate and the respective one hollow upper end portion of the guide thimble inserted therein;

(c) means for moving said cutter in a first direction toward the one of said passageways until said cutter is inserted within said passageway and the respective upper end portion of the guide thimble therein and its cutting element is positioned in a predetermined cutting plane extending generally perpendicular to said first direction and intersecting said guide thimble upper end portions at positions located past their regions of attachment to said adapter plate;

(d) said moving means also for moving said cutter in a second, opposite direction away from said one passageway to remove said cutter from said passageway of said top nozzle adapter plate after said cutting element has been actuated to sever a top marginal edge of said guide thimble, which includes said region of attachment, along said predetermined plane from the remainder of said upper end portion thereof; and (e) said positioning means including (i) a guide fixture having upper and lower members, said upper member being mounted to said lower member for movement toward and away therefrom between upper and lower positions, said cutter being mounted to said upper member and movable therewith relative to said lower member between raised and inserted positions, and (ii) releasable locking means mounted on one of said lower member and said top nozzle and mateable with the other thereof for securing said guide fixture to said top nozzle with said cutter aligned with said passageway in said adapter plate and hollow upper end portion of said guide thimble, (iii) said guide fixture also for removing said top nozzle from the severed upper end portions of said guide thimbles and said cutter therewith when said guide fixture is secured to said top nozzle.

5. The apparatus as recited in claim 4, wherein said releasable locking means includes a pair of hollow expandable split sleeves fixedly mounted in a pair of opposite diagonal corners of said lower member and a pair of wedge pins mounted for axial movement in said respective sleeves, said sleeves being insertable within respective bores defined in a pair of opposite diagonal corners of said top nozzle such that when so inserted and said wedge pins are moved in a first direction said sleeves expand into frictional engagement with said bores and secure said lower member to said top nozzle, whereas when said wedge pins are moved in a second, opposite direction said sleeves contract and release the frictional engagements with said bores allowing removal of said lower plate from said top nozzle.

6. For use with a fuel assembly including a top nozzle having a central adapter plate with a plurality of passageways defined through the adapter plate and a plurality of control rod guide thimbles with hollow upper end portions inserted in the passageways and attached to the top nozzle adapter plate at the upper ends of the passageways, an apparatus for removing the top nozzle from the guide thimbles, comprising:
 (a) at least one elongated cutter having a cutting element;
 (b) means for positioning said cutter in general alignment with one of said passageways in said top nozzle adapter plate and the respective one hollow upper end portion of the guide thimble inserted therein;
 (c) means for moving said cutter in a first direction toward the one of said passageways until said cutter is inserted within said passageway and the respective upper end portion of the guide thimble therein and its cutting element is positioned in a predetermined cutting plane extending generally perpendicular to said first direction and intersecting said guide thimble upper end portions at positions located past their regions of attachment to said adapter plate;
 (d) said moving means also for moving said cutter in a second, opposite direction away from said one passageway to remove said cutter from said passageway of said top nozzle adapter plate after said cutting element has been actuated to sever a top marginal edge of said guide thimble, which includes said region of attachment, along said predetermined plane from the remainder of said upper end portion thereof;
 (e) said positioning means including a guide fixture having upper and lower members, said upper member being mounted to said lower member for movement toward and away therefrom between upper and lower positions, said cutter being mounted to said upper member and movable therewith relative to said lower member between raised and inserted positions, said guide fixture also for removing said top nozzle from the severed upper end portions of said guide thimbles and said cutter therewith; and
 (f) said moving means including means interconnecting said upper and lower members, said means being rotatably mounted to one of said members and threaded through the other of said members such that rotation of said means in one direction causes movement of said upper member toward said lower member and rotation of said means in an opposite direction causes movement of said upper member away from said lower member.

7. The apparatus as recited in claim 6, wherein:
said upper and lower members are in the form of upper and lower plates; and
said interconnecting means is in the form of a threaded shaft.

8. The apparatus as recited in claim 7, wherein:
said cutter has a portion extending below said lower plate and mounting said cutting element; and
said lower plate includes a continuous skirt depending therefrom which surrounds said portion of said cutter mounting said cutting element for protecting the same from damaging contact during positioning thereof in alignment with said passageway of said top nozzle adapter plate.

* * * * *